(12) United States Patent
Bonnet

(10) Patent No.: US 7,538,446 B2
(45) Date of Patent: May 26, 2009

(54) GEAR INTEGRATED GENERATOR FOR WIND TURBINE

(75) Inventor: Laurent Bonnet, Mesum (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/766,218

(22) Filed: Jun. 21, 2007

(65) Prior Publication Data

US 2008/0315697 A1   Dec. 25, 2008

(51) Int. Cl.
F03D 11/02 (2006.01)
H02K 7/18 (2006.01)

(52) U.S. Cl. .......................................... 290/55; 310/83
(58) Field of Classification Search .................. 290/55
See application file for complete search history.

(56) References Cited

U.S. PATENT DOCUMENTS

| | | | | |
|---|---|---|---|---|
| 4,291,233 A | * | 9/1981 | Kirschbaum | 290/1 C |
| 4,871,923 A | * | 10/1989 | Scholz et al. | 290/55 |
| 5,663,600 A | * | 9/1997 | Baek et al. | 290/55 |
| 6,232,673 B1 | * | 5/2001 | Schoo et al. | 290/55 |
| 6,864,611 B1 | | 3/2005 | Wobben | |
| 6,903,466 B1 | * | 6/2005 | Mercier et al. | 290/44 |
| 6,943,462 B2 | | 9/2005 | Wobben | |
| 7,179,056 B2 | * | 2/2007 | Siegfriedsen | 416/170 R |
| 2004/0247437 A1 | * | 12/2004 | Otaki et al. | 416/132 B |
| 2007/0249457 A1 | * | 10/2007 | Tesar | 475/180 |

FOREIGN PATENT DOCUMENTS

| | | | |
|---|---|---|---|
| JP | 05079450 A | * | 3/1993 |
| JP | 2002303254 A | * | 10/2002 |
| WO | WO 2005075822 A1 | * | 8/2005 |

* cited by examiner

*Primary Examiner*—Joseph Waks
(74) *Attorney, Agent, or Firm*—Global Patent Operation

(57) ABSTRACT

A gear integrated generator for a wind turbine having a tower, a nacelle, and a hub is described. The gear integrated generator includes: a stator supporting frame having a stator supporting portion, a radially extending portion and a rotor frame supporting portion, wherein the stator supporting frame is stationarily mountable within the nacelle. A rotor frame is rotatably supported on the rotor frame supporting portion of the stator supporting frame. The rotor frame is connected to the hub and a gear, that is driven by the rotor frame. The gear includes a ring gear stationarily mounted to the stator support frame, a carrier gear assembly, and a ring-shaped sun gear. The gear integrated generator further includes: a rotor generator ring support frame rotatably supported and radially positioned outward of the rotor frame supporting portion of the stator supporting frame.

21 Claims, 3 Drawing Sheets

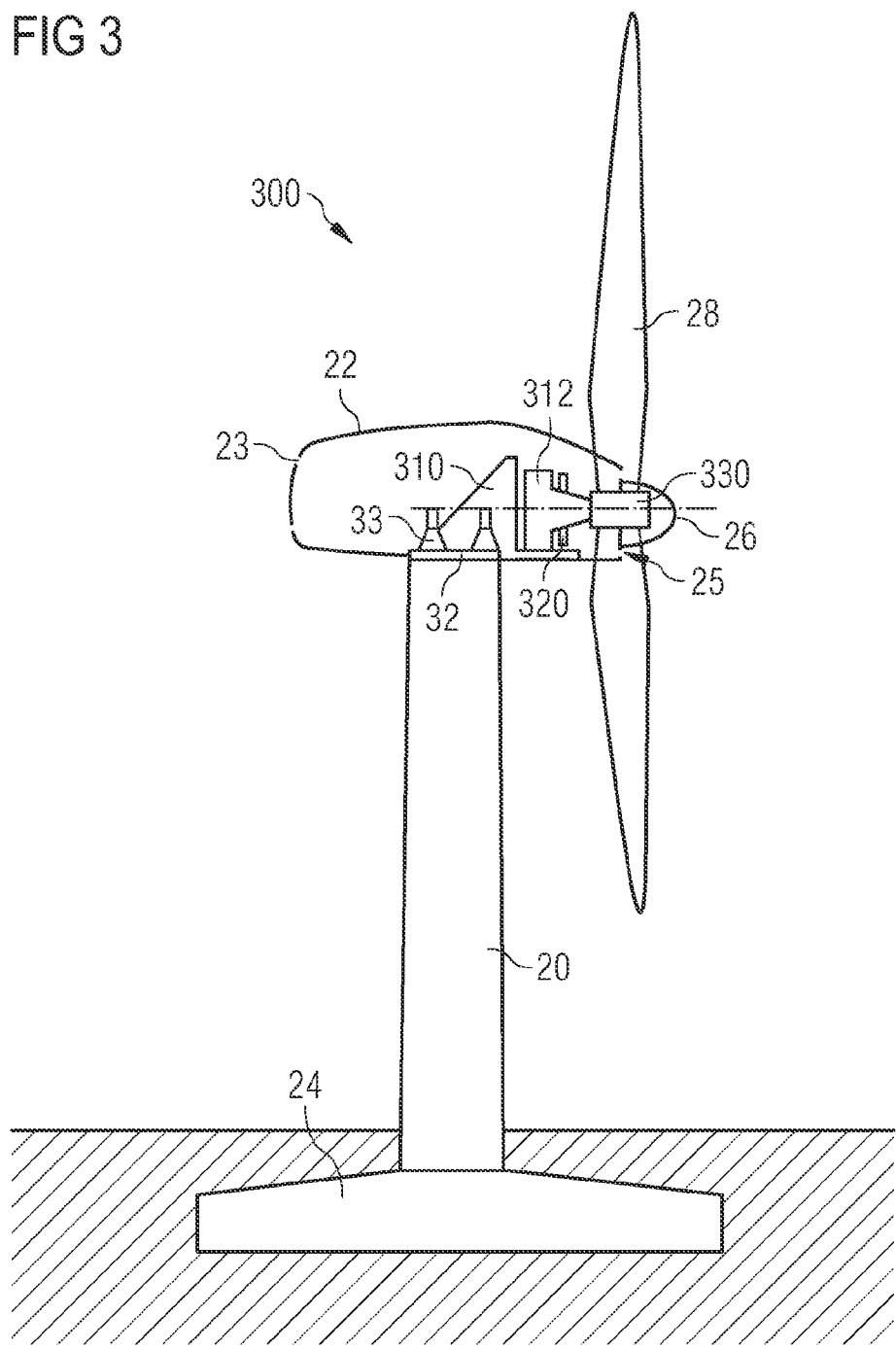

GEAR INTEGRATED GENERATOR FOR WIND TURBINE

BACKGROUND OF THE INVENTION

The present invention relates to wind turbines and compact generators used in wind turbines. Specifically, the present invention relates to a gear integrated generator, a wind turbine including a gear integrated generator; and a method of manufacturing a gear integrated generator.

Wind turbines are experiencing increasing demand. Therefore, large multimegawatt wind turbines are being installed in many locations throughout the world. On the one hand, direct drive generators provide difficulties for the continuously increasing size, because an up-scaling of a ring generator results in an increasing mass and a difficulty in controlling thermal growth. On the other hand, higher rotating speed generators provide a lower efficiency and might limit the life-cycle of rotating parts. An increase in lifetime would be particularly desirable for offshore applications.

As a result, there is a desire to reduce the weight of components, like generators and gears, included in modern wind turbines and to increase the lifetime of these components.

BRIEF DESCRIPTION OF THE INVENTION

In view of the above, according to one embodiment of the invention, a generator for a wind turbine having a tower, a nacelle, and a hub is provided. The generator includes: a stator supporting frame having a stator supporting portion, a radially extending portion and a rotor frame supporting portion, wherein the stator supporting frame is stationary mountable within the nacelle. A rotor frame is rotatably supported on the rotor frame supporting portion of the stator supporting frame, wherein the rotor frame is connected to the hub, and a gear driven by the rotor frame. The gear includes: a ring gear stationarily mounted to the stator support frame, a carrier gear assembly, and a ring-shaped sun gear. The generator also includes a rotor generator ring support frame that is rotatably supported and radially positioned outward of the rotor frame supporting portion of the stator supporting frame.

Further embodiments, aspects, advantages and features are apparent from the dependent claims, the description and the accompanying drawings.

According to yet another embodiment of the invention, a wind turbine is provided having a tower, a nacelle; a hub; and a gear integrated generator. The gear integrated generator includes: a stator supporting frame having a stator supporting portion, a radially extending portion and a rotor frame supporting portion, wherein the stator supporting frame is stationarily mountable within the nacelle. A rotor frame is rotatably supported on the rotor frame supporting portion of the stator supporting frame, wherein the rotor frame is connected to the hub. A gear driven by the rotor frame includes, a ring gear stationarily mounted to the stator support frame; a carrier gear assembly; and a ring-shaped sun gear. The gear integrated generator includes a rotor generator ring support frame that is rotatably supported and radially positioned outward of the rotor frame supporting portion of the stator supporting frame.

According to another embodiment of the invention, a gear integrated generator for a wind turbine having a tower, a nacelle, and a hub is provided. The gear integrated generator includes: a stator supporting frame having a stator supporting portion, a radially extending portion and a rotor frame supporting portion, wherein the stator supporting frame is stationary mountable within the nacelle. A rotor frame is rotatably supported on the rotor frame supporting portion of the stator supporting frame, wherein the rotor frame is connected to the hub. A gear with a ring-shaped sun gear is positioned so that it is radially outward with respect to a portion of the rotor frame supporting portion of the stator supporting frame.

According to yet another embodiment of the invention, a wind turbine is provided having a tower, a nacelle; a hub; and a gear integrated generator. The gear integrated generator includes: a stator supporting frame having a stator supporting portion, a radially extending portion and a rotor frame supporting portion, wherein the stator supporting frame is stationary mountable within the nacelle. A rotor frame is rotatably supported on the rotor frame supporting portion of the stator supporting frame, wherein the rotor frame is connected to the hub; and a gear with a ring-shaped sun gear, wherein the ring-shaped sun gear is positioned to be radially outward with respect to a portion of the rotor frame supporting portion of the stator supporting frame.

Yet further embodiments are also directed to wind farms including a plurality of wind turbines, wherein at least one wind turbine includes a gear integrated generator as described herein.

BRIEF DESCRIPTION OF THE DRAWINGS

A full and enabling disclosure of the present invention including the best mode thereof, to one of ordinary skill in the art is set forth more particularly in the remainder of the specification, including reference to the accompanying figures wherein:

FIG. 3 shows a schematic drawing illustrating a wind turbine including the gear integrated generator.

DETAILED DESCRIPTION OF THE INVENTION

Reference will now be made in detail to the various embodiments of the invention, one or more examples of which are illustrated in the figures. Each example is provided by way of explanation of the invention and is not meant as a limitation of the invention. For example, features illustrated or described as part of one embodiment can be used on or in conjunction with other embodiments to yield yet a further embodiment. It is intended that the present invention includes such modifications and variations.

Generally, embodiments described herein refer to improved wind turbine generators and gears for a high ratio of power output versus compact size and/or weight. Further, an improved lifetime of rotating gear and generator parts is provided. An increase in lifetime might be particularly desirable for offshore applications. However, this aspect is not limited to offshore applications and can be employed in land based applications as well.

Figure 1:
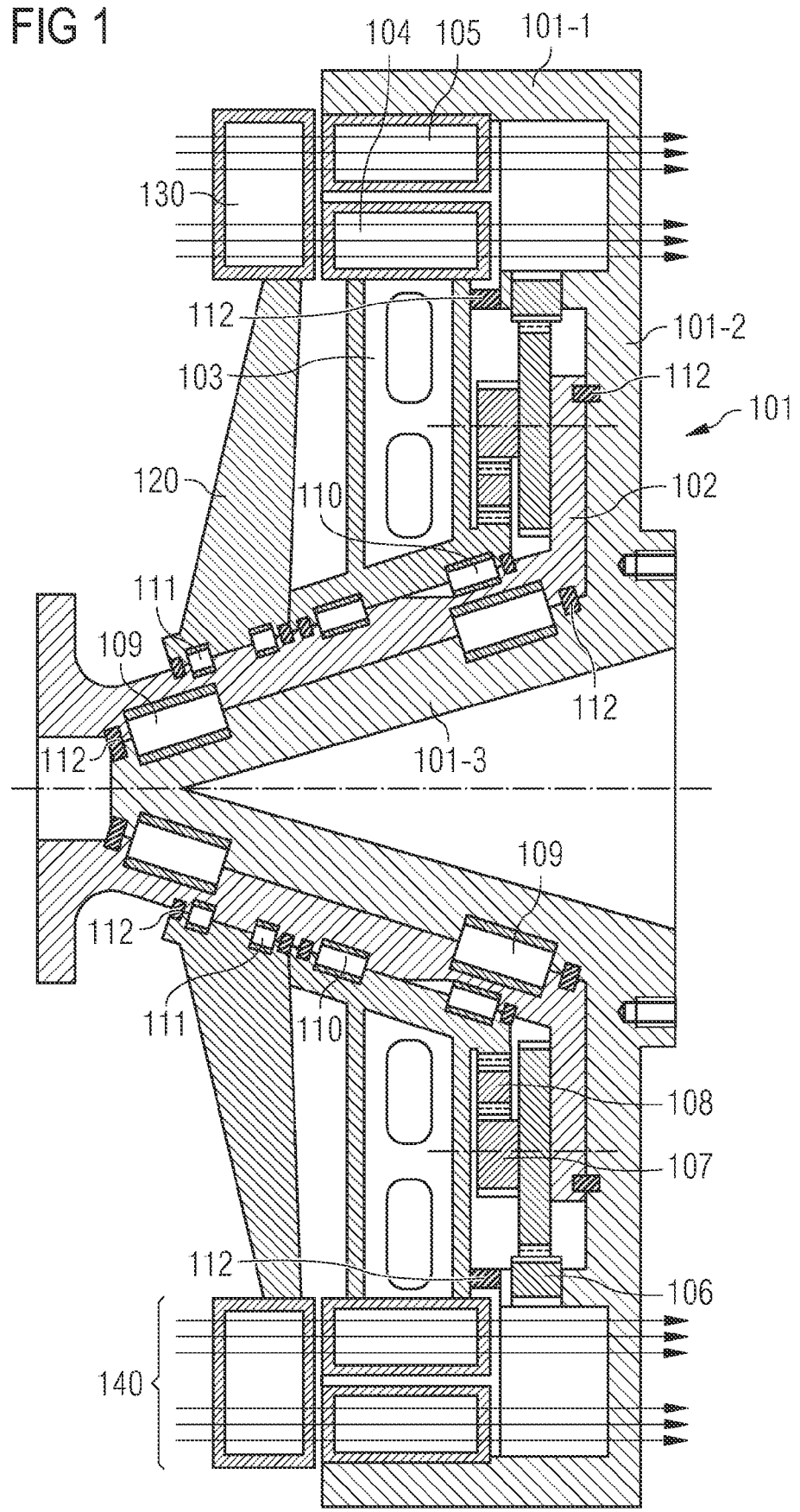
FIG. 1 shows a schematic drawing illustrating a gear integrated generator for a wind turbine according to embodiments described herein.

Within FIG. 1, a generator with an integrated gear is shown. Thereby, a generator is a ring generator having a compact design. FIG. 1 shows a stator supporting frame 101 for supporting the stator of the ring generator. The stator is, for example, a multi-pole ring. The rotor frame 102 is connected to the hub 330 (see FIG. 3), which rotates together with the rotor blades 28 (see FIG. 3) of the wind turbine 300. The rotor frame 102 drives the rotor generator ring support frame 103 via an integrated gear. Thereby, the rotor generator ring 104 is rotatably moved with respect to the stator generator ring 105.

Typically, the rotor generator ring 104 can be a rotor generator multipole ring and the stator generator ring 105 can be a stator generator multi-pole ring. A generator ring stator with multi-pole windings can be fixed with regard to the wind turbine structure. Further, concentric ring rotor multi-pole windings or multi-pole permanent magnets can be provided.

According to embodiments described herein, a ring turbine fan bladed wheel 130 can be provided within the compact design on ring turbine fan support wheels 120. Thereby, corresponding airflow is provided as indicated by reference numeral 140.

According to one embodiment, the stator supporting frame 101 is mounted to the wind turbine main frame or an intermediate frame (both not shown) within the nacelle of the wind turbine 300. The stator supporting frame 101 includes a stator supporting portion 101-1, a radially extending portion 101-2, and a supporting portion for the rotor frame 101-3. The stator supporting portion 101-1, the radially extending portion 101-2 and the supporting portion 101-3 for the rotor frame form a C-shaped stator frame 101.

A first set of bearings 109 are provided between the stator frame 101, i.e. the supporting portion for the rotor frame 101-3, and the rotor frame 102. Thereby, the rotor frame 102 is rotatably mounted to the stator frame 101 at a radially outward location with regard to the rotor frame supporting portion 101-3 of the stator portion.

According to a further embodiment, the supporting portion for the rotor frame 101-3 is inclined with respect to the rotational axis of the wind turbine, i.e., the rotational axis of the rotor generator ring support frame. Thereby, the stator supporting frame 101 has a conical shape at the rotor frame supporting portion 101-3 of the stator supporting frame 101.

However, according to even further embodiments, which can be combined with other embodiments described herein, the rotor frame supporting portion 101-3 of the stator supporting frame 101 and portions being supported thereon can also have a cylindrical shape. Generally, the embodiments described herein may be modified to yield even further embodiments with an angle between the rotation axis and the rotor frame supporting portion 101-3 of the stator supporting frame 101 of 0° to 45°. Further, according to additional embodiments, the gear integrated generator can, thereby, be formed of stacked cylindrical sections.

Further, a ring gear 106 is mounted to the stator supporting frame 101. The ring gear 106 may typically be mounted at the radially extending portion 101-2 of the stator supporting frame. In this case, for example, a ring gear 106 or holding portion may be provided in the C-shaped stator supporting frame 101. According to a different embodiment, the ring gear 106 could also be mounted to the stator supporting portion 101-1 of the stator supporting frame.

According to embodiments described herein, the gear stage can be integrated between the rotor generator ring support frame 103 and the rotor frame 102. According to further embodiments, the gear stage can be integrated radially inside the stator supporting portion 101-1 of the stator supporting frame.

According to one embodiment of the present invention, an epicyclic or planetary gear is provided. Thereby, the ring gear 106 is fixed with respect to the stator supporting frame. A carrier gear 107 provides the gear ratio between the ring gear 106 and the sun gear 108. Thereby, the sun gear 108 may also be considered as the rotor ring gear. According to embodiments described herein, the sun gear 108 is ring-shaped.

According to different embodiments of the present invention, the carrier gear 107 can be a multiple satellite simple gear or a compound gear. For the embodiments described herein, as an example, a compound planetary gear can be used. Whether a simple or compound gear is provided depends on the desired total gear ratio. The carrier gear 107 is rotatably mounted to the rotor frame, such that each of the, for example, four carrier gears rotate around an axis parallel to the generator axis. The sun gear 108 is fixedly mounted to the rotor generator ring support frame and, thereby, drives the rotor generator ring.

According to yet another embodiment of the present invention, the rotor generator ring support frame 103 is rotatably mounted to the rotor frame 102 and is positioned radially outward of the supporting portion 101-3 for the rotor generator ring support frame. Thereby, second bearings 110 are provided between the rotor frame 102 and the rotor generator ring support frame 103.

The compact ring generator according to the embodiments described herein, has an integrated gear, for example, a single stage gear, in order to provide a compact design. Thereby, the gear can be provided between the radially extending portion of the stator supporting frame 101 and the rotor generator ring support frame 103.

In light of the one-stage gear, which is provided herein, a medium rotating speed generator can be provided. Thereby, a higher efficiency and an extended lifetime can be obtained as compared to a system including a three-stage gearbox and a high rotating speed generator. Further, a more compact drive train integrated into a multi-pole ring generator can be provided. Thereby, as compared to a direct drive generator an improved weight to power ratio and, thus, increased cost-efficiency can be obtained.

According to some typical embodiments a medium speed can be defined as follows. The planetary gear is a single stage having a typical gear ratio of 2.5 to 20, wherein the compound gear 107 can sub-divide this ratio into half. That is, the ratio is 1.4 to 4.5 in between the ring gear 106 and the outer gear of the compound gear 107 and also 1.4 to 4.5 in between ring gear 108 and the inner gear of the compound gear 107.

According to different embodiments of gear integrated compact wind generators for wind turbines, one or more of the following features can be provided. The stator supporting frame 101, the rotor frame 102, the rotor generator ring support frame 103 and the turbine fan support wheel 120 can be welded frames, casted frames, or composite molded structures with metal inserts for flange and bearing interfaces. Thereby, it is according to further embodiments possible that the rotor frame 102, the rotor generator ring support frame can be a sub-assembly of stacked machined disks bolted together (inner conical parts), which are bolted to the outer welded frame, casted frame or composite molded structures.

Typically, the stator supporting frame 101, the rotor frame 102 and the rotor generator ring support frame 103 can be concentric with each other. The rotor frame 102 rotates with respect to the stator frame 101 as a wheel on first bearings 109. The rotor generator ring support frame 103 rotates with respect to the rotor frame 102 as a wheel on the second bearings 110.

The rotor frame is driven by the rotor blades 28 of the wind turbine 300 via a hub 330 (see FIG. 3). The rotor frame is driving the planet carrier from the satellite gears which are rotating inside the ring gear 106. Hence, torque is transmitted with the planet gear to the rotor generator ring support frame 103. Thereby, for example, the rotor generator ring support frame 103 and the sun gear 108 are bolted to each other.

According to one embodiment, the compact design is realized by providing the gear components between the radially extending portion of the stator supporting frame 101 and the rotor generator ring support frame 103. Thereby, the rotor frame 102 is mounted concentrically with respect to the stator supporting frame 101 and the rotor generator ring support frame 103 is mounted rotatably and radially outward of the rotor frame 102, i.e., the portion of the rotor frame 102, which is rotating on the rotor frame support portion of the stator supporting frame. Generally, the rotor frame and the rotor generator ring support frame are both supported, directly or indirectly, by the supporting portion 101-3 for the rotor generator ring support frame of the stator supporting frame 101.

Figure 2:
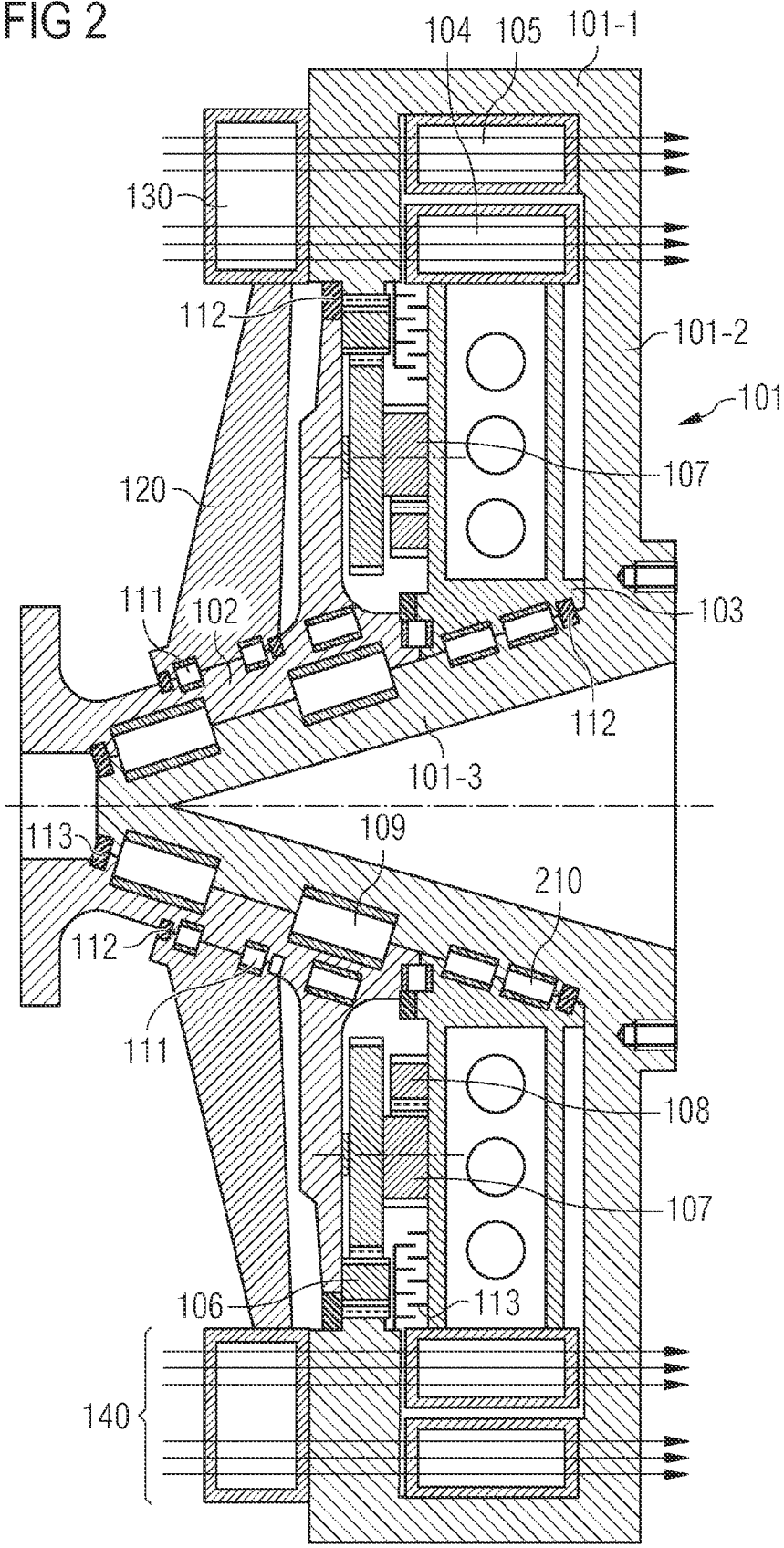
FIG. 2 shows a schematic drawing illustrating another gear integrated generator for a wind turbine according to embodiments described herein.

According to another embodiment of the present invention, as shown in FIG. 2, the rotor frame 102 and the rotor generator ring support frame 103 could be independently supported by the supporting portion 101-3 of the stator supporting frame 101. As shown in FIG. 2, the gear components would then be provided on the left-hand side of the rotor generator ring support frame 103. Thus, the rotor frame 102 and the rotor generator ring support frame 103 could both be directly supported by the stator supporting frame 101.

Generally, according to some of the embodiments described herein, the rotor frame support portion 101-3 of the stator frame can be conical. Then, the rotor frame portion and the rotor generator ring support frame portion are rotatably mounted on the rotor frame support portion 101-3 of the stator frame have a corresponding conical shape as for example shown in FIG. 2.

FIG. 2 shows a stator supporting frame 101 for supporting the stator of the ring generator. Typically, the rotor generator ring 104 can be a rotor generator multi-pole ring and the stator generator ring 105 can be a stator generator multi-pole ring. A generator ring stator with multi-pole windings can be fixed with regard to the wind turbine structure. Further, concentric ring rotor multi-pole windings or multipole permanent magnets can be provided and driven by the rotor blades 28 of the wind turbine 300.

Generally, embodiments of FIG. 2 can be yielded by combining the arrangement shown in FIG. 2 with details of embodiments described with respect to FIG. 1. For example, the stator supporting frame 101 includes a stator supporting portion 101-1, a radially extending portion 101-2, and a supporting portion for the rotor frame 101-3. An additional portion for supporting the stator ring gear can be provided. The stator supporting portion, the radially extending portion and the porting portion for the rotor frame are formed in a C-shape.

According to yet further embodiments of the present invention, the supporting portion for the rotor frame is inclined with respect to the rotational axis of the wind turbine, i.e., the rotational axis of the rotor generator ring support frame. Thereby, the stator supporting frame 101 has a conical shape at the rotor frame supporting portion 101-3 of the stator supporting frame 101.

Further, a ring gear 106 is mounted to the stator supporting frame 101. As an example, the ring gear 106 can be mounted to the stator supporting portion of the stator supporting frame.

According to another embodiment of the present invention, an epicyclic or planetary gear is provided. Thereby, the ring gear 106 is fixed with respect to the stator supporting frame. A carrier gear 107 provides the gear ratio between the ring gear 106 and the sun gear 108. Thereby, the sun gear 108 may also be considered as the rotor ring gear. According to some of the embodiments described herein, the sun gear 108 is ring-shaped.

According to different embodiments, the carrier gear 107 can be a multiple satellite simple gear or a compound gear.

According to yet another embodiment, the rotor generator ring support frame 103 is rotatably mounted to the stator supporting frame 101 and radially outward of the supporting portion 101-3 for the rotor generator ring support frame. Thereby, second bearings 210 are provided between the stator frame 101 and the rotor generator ring support frame 103.

According to different embodiments of gear integrated compact wind generators for wind turbines, one or more of the following features can be provided.

The stator supporting frame 101 can be, for example, machined casting or a welded frame including ribs. Alternatively or additionally, it may be bolted to a main frame or an intermediate frame and, thereby, to an azimuth bearing and the tower. The rotor frame 102 can include, for example, machined casting material or a stack of machined steel discs, which are bolted together. The rotor generator ring support frame 103 can be, for example, a welded wheel with radial beams extending for holding the rotor generator multi-pole ring 104.

Typically, the stator supporting frame 101, the rotor frame 102 and the rotor generator ring support frame 103 can be concentric with each other. The rotor frame 102 rotates with respect to the stator frame 101 as a wheel on first bearings 109. The rotor generator ring support frame 103 also rotates with respect to the stator frame 101 as a wheel on the second bearings 110.

The rotor frame is driven by the rotor of the wind turbine. The rotor frame is driving the planet carrier from the satellite gears which are rotating inside the ring gear 106. Hence, torque is transmitted with the planet gear to the rotor generator ring support frame 103. Thereby, for example, the rotor generator ring support frame 103 and the sun gear 108 are bolted to each other.

According to yet further embodiments, which can be combined with any of the embodiments described with respect to FIGS. 1 and 2, a cooling airflow fan will be supported concentrically and radially outwardly of the rotor frame 102.

The air cooling system will now be described. A generator rotor 104 and a generator stator 105 include cooling slots for providing cooling air to travel from the hub through the generator rotor and the generator stator. According to one embodiment, the cooling slots can include flow entrance forward swirled flow guides. Typically, air cooling can be provided in an axially uniform manner to ensure controlled clearances between the rotor and stator, and to avoid excessive operating temperatures.

One or more through-holes in the stator frame 101 can allow for the desired cooling air flow.

The ring turbine fan support wheel 120 is rotatably mounted outwardly of the rotor frame 102, for example, via a third set of bearings 111. The fan support wheel can be actuated by, for example, electrical motors. According to different embodiments, the motors may either be supported by the rotor frame 102 or the rotor generator ring support frame 103. Thus, e.g., gear mechanical drives or electrical drives can be provided for the fan 130. According to yet further embodiments, a direct or an indirect power feed can be provided.

The wind turbine fan 130 can include a high number of high camber blades with both, a foot and tip continuous flow ring. The wind turbine fan 130 is counter rotating to the generator rotor. The generator rotor 103, generator stator 105 and stator supporting structure 101-1 feature all continuous aligned air flow slots with slot entrance blade vanes which are fixed with a relative camber and angle of attack to create high pressure with respect to rotating fan 130 blades (rotor-stator blades) in order to create a required nominal air flow mass rate through cooling slots pressure drop. Generator stator 105 and stator supporting structure 101-1 slot entrance blade vanes can be designed in order to balance the mass flow rate in between both. Air flow velocity can be in turn be determined by the fan 130 rotor and stator blades pressure rise in order to maintain forced flow in accordance to temperature and altitude range air density variations but also can insure turbulent flow to optimize heat exchange coefficient though cooling slots for each (rotor/stator) windings and permanent magnet rings.

According to further embodiments of the present invention, the fan operation can be adjusted as a function of atmospheric temperature, generator loads, and the like. According to further embodiments, seals (not shown) can be provided between the turbine fan, the generator stator slots, and/or the generator rotor slots to ensure that atmospheric air flows from the generator rotor and stator flow without contamination. The seals can, according to one embodiment, be lip seals including elastomer seals, metal lips or combinations thereof.

The design of the gear integrated compact wind generator allows, for example, to replace turbine fan blades and/or flow guides in situ. Thus, downtimes of the wind turbine can be reduced. Generally, embodiments described with respect to FIGS. 1 and 2 allow for individually servicing gear components, electrical windings, magnets, forced air cooling blades and/or flow guides.

According to further embodiments, typically in the case of doubly-fat generators, the following perimeter sealing systems can be provided. According to one embodiment, the cavity around gear can be sealed with respect to other areas of the system by lip seals 112. (See, e.g., FIGS. 1 and 2.) As an example, lips can be provided in the form of O-rings made of elastomers, elastomer lips or metal lips. According to another embodiment, labyrinth seals 113 (see, e.g., FIG. 13) may additionally or alternatively be provided. Generally, the different kind of seals can be arbitrarily combined as appropriate.

According to different embodiments, at least one of the following different seals 112,113 can be provided. For example, between the generator rotor support frame and the stator support frame and the outer perimeter of the generator rotor frame, e.g., in the vicinity of the carrier gear 107. Further, between the generator rotor and the planet carrier. As shown, in FIGS. 1 and 2, seals can, according to further embodiments, additionally or alternatively be provided near both end portions of the rotor support portion for the rotor frame 101-3 and in between the stator frame 101 and the rotor frame 102. Further, the bearing areas of the rotor support frame 103 and/or the fan support wheel 120 can be additionally or alternatively sealed with a seal.

The cavity including the gear can have a pressurized oil lubrication system. Thereby, the gear cavity is pressurized. Alternatively, the gear cavity may have a negative pressure. Nozzles for distributing oil spray ensure lubrication of the satellite gears with overpressure. Additionally, oil filtration can be provided to avoid contamination. According to further embodiments, alternatively or additionally, an oil-air system for lubrication with an oil foam can be provided.

According to a further embodiment, it is possible that the stator supporting frame 101-1 includes a perimeter conduction tracks to couple with generator rotor 104 brushes or series of parallel brushes in order to transmit electrical power; in turn perimeter conduction tracks can be integrated with insulated casings including filtered air infiltration to avoid brush particle contamination. According to a further embodiment, it is possible that the stator supporting frame 101-1 includes a perimeter power transmission induction ring or series of induction rings to couple with the generator rotor 104 and to transmit electrical power contact-less.

The wind turbine gear integrated compact ring generator according to the embodiments described herein can provide an integrated medium speed generator. A high power efficiency can be obtained as a result of the single-stage gear, and the compact size and light weight can be realized. Thereby, a loss can be reduced to about 1% gear and bearing loss and about 1% electrical loss. An active (forced) air cooling for lower operations of windings/permanent magnets as well as a controlled thermal growth and clearance is possible with the embodiments described herein. The reduced rotating speed as compared to high rotating speed generators features increased lifetime.

According to further embodiments, a wind turbine gear integrated ring generator can be used in a wind turbine as shown in FIG. 3. FIG. 3 shows a wind turbine 300 includes a tower 20, which is mounted on a foundation 24. On top of the tower 20 there is a nacelle with a nacelle shell 22. Hub 330, which can include hub nose shell 26 is mounted to the nacelle and carries the rotor blades 28. The wind turbine 300 includes three rotor blades 28. According to other embodiments one, two, or four or more rotor blades may be included in the wind turbine.

According to one embodiment, the wind turbine 300 is a horizontal axis wind turbine, as shown in FIG. 3. However, according to other embodiments, other types of wind turbine, for example, a wind turbine with the vertical axis may be used.

The hub 330 is connected to the rotor frame 102 of the wind turbine gear integrated generator 312. The wind turbine gear integrated generator further includes the forced air cooling fan 320.

Further, the ring turbine gear integrated generator 312, that is the rotor frame thereof at a flange on the radially extending portion 101-2 is mounted to the frame or supporting structure 310, e.g., a main frame or an intermediate frame. The gear integrated generator 312 is, according to one embodiment, connected to the tower 20 via an azimuth bearing 32, which is driven by azimuth drives 33.

Additionally, one or more air gaps 25 can be provided between the hub nose shell 16 and the nacelle shell 22. Additionally or alternatively air gaps can be provided at the hub nose shell 16 and/or the nacelle shell 22. Thereby, air intake for the air cooling fan 320 can be provided. Exhaust apertures, which can be provided at an appropriate position in the nacelle shell 22, for release of heat mass flow are illustrated in FIG. 3 by reference numeral 23.

While the foregoing is directed to embodiments of the invention, other and further embodiments of the invention may be devised without departing from the basic scope thereof, and the scope thereof is determined by the claims that follow.

What is claimed is:

1. A generator for a wind turbine having a tower, a nacelle, and a hub, the generator comprising:
   a stator supporting frame having a stator supporting portion, a radially extending portion and a rotor frame supporting portion, wherein the stator supporting frame is stationarily mountable within the nacelle;
   a rotor frame rotatably supported on the rotor frame supporting portion of the stator supporting frame, wherein the rotor frame is connectable to the hub;
   a gear driven by the rotor frame, the gear comprising:
      a ring gear stationarily mounted to the stator supporting frame;

a carrier gear assembly rotatably mounted to the rotor frame and meshing with the ring gear; and
a ring-shaped sun gear meshing with the carrier gear assembly; and
a rotor generator ring support frame rotatably supported and radially positioned outward of the rotor frame supporting portion of the stator supporting frame,
wherein the sun gear is fixedly and directly mounted to the rotor generator ring support frame.

2. The generator according to claim 1, wherein the rotor frame supporting portion has a generally cylindrical shape.

3. The generator according to claim 1, wherein the rotor generator ring support frame is rotatably supported and radially positioned outward and adjacent to the rotor frame which is radially positioned outward and adjacent to the rotor frame supporting portion of the stator supporting frame.

4. The generator according to claim 1, wherein the rotor generator ring support frame is adjacent to the rotor frame supporting portion of the stator supporting frame.

5. The generator according to claim 1, wherein the carrier gear assembly is at least one of a compound gear assembly and a simple gear assembly.

6. The generator according to claim 1, wherein the gear driven by the rotor frame is a single-stage gear.

7. The generator according to claim 1, wherein the carrier gear assembly comprises at least two satellite gears.

8. The generator according to claim 1, further comprising:
a turbine fan support wheel rotatably supported and radially positioned outward and adjacent to the rotor frame, and
a turbine fan supported by the turbine fan support wheel.

9. The generator according to claim 8, wherein the turbine fan is a ring turbine fan bladed wheel.

10. The generator according to claim 1, further comprising a generator stator and a generator rotor, wherein the generator stator is supported by the stator supporting frame and wherein the generator rotor is supported by the rotor generator ring support frame.

11. The generator according to claim 10, wherein at least one of the generator stator and the generator rotor includes at least one of multi-pole windings and multi-pole permanent magnets.

12. The generator according to claim 1, wherein the rotor frame supporting portion has a generally conical shape.

13. A wind turbine comprising:
a tower;
a nacelle disposed on the tower;
a hub;
a stator supporting frame having a stator supporting portion, a radially extending portion and a rotor frame supporting portion, wherein the stator supporting frame is stationarily mounted within the nacelle;
a rotor frame rotatably supported on the rotor frame supporting portion of the stator supporting frame, wherein the rotor frame is connected to the hub;
a gear driven by the rotor frame, the gear comprising:
a ring gear stationarily mounted to the stator supporting frame;
a carrier gear assembly rotatably mounted to the rotor frame and meshing with the ring gear; and
a ring-shaped sun gear meshing with the carrier near assembly; and
a rotor generator ring support frame rotatably supported and radially positioned outward of the rotor frame supporting portion of the stator supporting frame,
wherein the sun gear is fixedly and directly mounted to the rotor generator ring support frame.

14. A generator for a wind turbine having a tower, a nacelle, and a hub, the generator comprising:
a stator supporting frame having a stator supporting portion, a radially extending portion and a rotor frame supporting portion, wherein the stator supporting frame is stationarily mountable within the nacelle;
a rotor frame rotatably supported on the rotor frame supporting portion of the stator supporting frame, wherein the rotor frame is connectable to the hub;
a gear comprising a ring-shaped sun gear, wherein the sun gear is positioned radially outward of the rotor frame supporting portion.

15. The generator according to claim 14, wherein the gear is driven by the rotor frame, the gear further comprising:
a ring gear stationarily mounted to the stator supporting frame; and
a carrier gear assembly rotatably mounted to the rotor frame and meshing with the ring gear and the sun gear;
wherein the generator further comprises a rotor generator ring support frame rotatably supported and radially positioned outward of the rotor frame supporting portion.

16. The generator according to claim 15, wherein the carrier gear assembly is at least one of a compound gear assembly and a simple gear assembly.

17. The generator according to claim 14, wherein the rotor frame supporting portion has a generally cylindrical shape.

18. The generator according to claim 14, wherein the gear is a single-stage gear.

19. The generator according to claim 14, further comprising:
a turbine fan support wheel rotatably supported and radially positioned outward and adjacent to the rotor frame, and
a turbine fan supported by the turbine fan support wheel.

20. The generator according to claim 14, further comprising a generator stator and a generator rotor, wherein the generator stator is supported by the stator supporting frame and wherein the generator rotor is supported by the rotor generator ring support frame, and wherein at least one of the generator stator and the generator rotor include multi-pole windings or multi-pole permanent magnets.

21. The generator according to claim 14, wherein the rotor frame supporting portion has a generally conical shape.

* * * * *